US011684952B2

(12) United States Patent
Schons et al.

(10) Patent No.: US 11,684,952 B2
(45) Date of Patent: Jun. 27, 2023

(54) SORTING DEVICE FOR SORTING OUT COINS

(71) Applicants: Georg Schons, Eigeltingen (DE); Marc Schons, Eigeltingen (DE)

(72) Inventors: Georg Schons, Eigeltingen (DE); Marc Schons, Eigeltingen (DE)

( * ) Notice: Subject to any disclaimer, the term of this patent is extended or adjusted under 35 U.S.C. 154(b) by 319 days.

(21) Appl. No.: 17/046,404

(22) PCT Filed: Apr. 10, 2019

(86) PCT No.: PCT/EP2019/059072
§ 371 (c)(1),
(2) Date: Oct. 9, 2020

(87) PCT Pub. No.: WO2019/197460
PCT Pub. Date: Oct. 17, 2019

(65) Prior Publication Data
US 2021/0031236 A1    Feb. 4, 2021

(30) Foreign Application Priority Data

Apr. 10, 2018  (DE) ............... 10 2018 108 511.7
Apr. 3, 2019   (DE) ............... 10 2019 108 732.5

(51) Int. Cl.
*B07B 1/14*        (2006.01)
*G07D 9/00*        (2006.01)

(52) U.S. Cl.
CPC ............. *B07B 1/14* (2013.01); *G07D 9/00* (2013.01)

(58) Field of Classification Search
CPC ........... B07B 1/14; B07B 15/00; B07B 1/145; B07B 4/025; B07B 13/003; B07B 13/04;
(Continued)

(56) References Cited

U.S. PATENT DOCUMENTS 6,086,472 A *  7/2000  Furukawa ............... G07D 3/14
                                                           453/56
7,503,840 B2 *  3/2009  Iwami .................... G07D 9/008
                                                           453/56
(Continued)

FOREIGN PATENT DOCUMENTS

CH        582546 A5     12/1976
CN       1256975 A       6/2000
(Continued)

OTHER PUBLICATIONS

International search report for patent application No. PCT/EP2019/059072 dated Aug. 7, 2019.

*Primary Examiner* — Patrick H Mackey
(74) *Attorney, Agent, or Firm* — Bachman & LaPointe, P.C.

(57) ABSTRACT

A sorting device for sorting out coins from bulk material, includes at least one sorting gap (5) for coins that is limited by at least one roller (2) which can be rotated by a drive (33) about an axis of rotation (A) such that objects that cannot be conveyed through the sorting gap (5) are applied with force by the roller (2) in a direction away from the sorting gap (5) wherein a discharge hood (6) is provided for an eddy current separator device (29), which has an adjustable trajectory separator unit (4) in a hood interior (7), wherein the at least one roller (2) is arranged in or on the discharge hood (6) in relation to the trajectory separator unit (4) such that a non-ferrous metal fraction separated from the bulk material by the trajectory separator unit (4) is guided in the direction of the sorting gap (5) by the weight force of the non-ferrous metal objects (12).

23 Claims, 6 Drawing Sheets

(58) Field of Classification Search
CPC .......... B07B 13/10; G07D 9/00; G07D 9/008; B03C 1/16; B03C 1/18; B03C 1/20
See application file for complete search history.

(56) References Cited

U.S. PATENT DOCUMENTS

| | | | | |
|---|---|---|---|---|
| 7,559,831 | B2 * | 7/2009 | Umeda | .................. G07D 9/008 |
| | | | | 271/274 |
| 7,806,756 | B2 * | 10/2010 | Umeda | .................... G07D 9/00 |
| | | | | 453/56 |
| 8,919,566 | B2 * | 12/2014 | Golovanevskiy | ..... B03C 1/0332 |
| | | | | 209/214 |
| 10,350,644 | B1 * | 7/2019 | Doak | ...................... B07C 5/368 |
| 2016/0016201 | A1 * | 1/2016 | Schons | .................... B07B 1/14 |
| | | | | 209/658 |

FOREIGN PATENT DOCUMENTS

| | | | |
|---|---|---|---|
| CN | 101438651 | A | 5/2009 |
| CN | 104884178 | A | 9/2015 |
| CN | 204620359 | U | 9/2015 |
| DE | 20217037 | U1 | 4/2003 |
| DE | 102013105560 | A1 | 12/2014 |
| EP | 0550867 | A1 | 7/1993 |
| EP | 2742491 | A1 | 6/2014 |
| JP | 0663152 | U | 9/1994 |
| JP | 3532171 | B2 * | 5/2004 |
| KR | 1020040027720 | A | 4/2004 |
| WO | 2013060349 | A1 | 5/2013 |
| WO | 2013060584 | A1 | 5/2013 |

* cited by examiner

SORTING DEVICE FOR SORTING OUT COINS

BACKGROUND OF THE INVENTION

The present invention relates to a sorting device for sorting out coins from bulk material, in particular from waste incineration slag and/or bulk metal, particularly preferably from bulk heavy metal and/or bulk non-ferrous metal, bulk non-ferrous metal being preferably produced or concentrated first and coins being subsequently sorted out from said bulk non-ferrous metal. Furthermore, the present invention relates to an eddy current separating device. Furthermore, the invention relates to the use of a sorting device for sorting out coins from bulk material and to the use of an eddy current separating device for sorting out coins from bulk material.

Slag from waste incineration plants or thermal waste utilization plants is known to contain coins. The same applies to bulk materials or bulk metals from vehicle recycling, for example. Technical recovery of the coins from waste incineration slag has until now entailed sorting out a metal fraction from the slag in a first process step, from which a coin concentrate or coins have subsequently been sorted out or filtered out using suitable devices and methods or by hand. Since a coin content of few grams can or has to be assumed for one ton of average household waste, the previous approach to recovering coins in an industrial process or using an industrial plant was such that the devices used both for producing bulk metal from the slag of the waste incineration plants and for producing or sorting out a coin concentrate needed to be able to handle large material throughputs.

A device of this kind for sorting out coins from bulk metal, which was conceived by the applicant, is known from international patent application WO 2013/060349 A1, for example. However, the device and the method described there and in particular their integration into the overall recovery process from waste incineration slag or a waste incineration slag fraction have proven disadvantageous in various respects.

For example, the known way of sorting out coins is disadvantageous because it requires a correspondingly great complexity regarding the devices used and because the individual process steps and their intermediate products also necessitate space-consuming storage and labor-intensive intermediate treatment of the individual products of the respective separating or sorting steps. For instance, the bulk metal to be produced has to be collected, stored and, if necessary, transported to another sorting device, where it has to be processed again, including in particular the sorting-out of the coins or the production of a coin concentrate, which will also have to be collected, stockpiled or stored again.

This is also disadvantageous in particular because the slag and the sorted-out bulk metal, if applicable, have aggressive or at least highly abrasive properties. For instance, the reactive lime contained in the slag and the residual moisture contained in the slag can cause components of the device, in particular belts, to stick, and/or the humidity of the slag can add to the corrosion of components of the device. The components of bulk metal can also accelerate wear of the devices used because of pointed or sharp portions or areas of the objects of the bulk metal, thereby significantly increasing the amount of maintenance and/or repair required for the device for coin recovery from waste incineration slag. As indicated above, however, these disadvantages, i.e., the high operating costs, are particularly critical parameters regarding economically reasonable coin recovery, especially considering the low coin content in thermally utilized waste, in particular in thermally utilized household waste.

EP 2 742 491 A1, which was conceived by the applicant, discloses a sorting device for sorting out coins from bulk material in which at least one sorting gap for coins is limited by a roller and in which the roller can furthermore be rotated about an axis of rotation by means of a drive in such a manner that objects that cannot be transported through the sorting gap are subjected to a force in a direction away from the sorting gap by the roller.

Furthermore, an eddy current separator having a trajectory separator device is known from CH 582 546.

SUMMARY OF THE INVENTION

In view of the above, the object of the present invention is to enhance a sorting device for sorting out coins from bulk material in such a manner that a more effective recovery, in particular a more cost-effective recovery, of coins can be achieved.

According to the invention, said object is attained by first integrating coin recovery into metal recovery by the sorting device having at least one sorting gap for coins, each sorting gap being limited by at least one roller which can be rotated about an axis of rotation by means of a drive in such a manner that objects, in particular non-ferrous metal objects, that cannot be transported through the sorting gap are subjected to a force in a direction away from the sorting gap by the roller, wherein the sorting device can be integrated into known or existing discharge hoods for an eddy current separating device which has a trajectory separator device, in particular an at least partially adjustable trajectory separator device, in a hood interior, the at least one roller being disposed in or on the discharge hood relative to the trajectory separator device in such a manner that a non-ferrous metal fraction separated out from the bulk material by the trajectory separator device is guided in the direction of the sorting gap by the weight of the non-ferrous metal objects.

So the basic idea of the present invention is based on the attempt to separate metals, in particular non-ferrous metals, from bulk material immediately prior to the sorting-out of coins from a metal fraction, in particular a non-ferrous metal fraction, in order to thus save working area and working space for corresponding devices, storage space and bearing means for the intermediate storage of intermediate products, and manpower for the treatment and processing of intermediate products. During the conception of the invention, it was found in a particularly unexpected and counterintuitive manner that the desired aim is achieved or the object mentioned above is attained by actually turning away from machines or devices with a high material throughput.

As described in the beginning, the known devices, such as the device mentioned from the state of the art, are optimized for high material throughput. This means that the devices from the state of the art tend to be geared toward processing or putting through more than 500 kg, in particular more than 1 t, of bulk metal per hour. A throughput of this size is not necessary at all using the sorting device according to the invention.

This is due to the fact that by providing a discharge hood and a trajectory separator device disposed in the discharge hood or in the hood interior of the discharge hood, the sorting device is configured for use or application together with an eddy current separating device or a separating device having the same effect, which, however, are not capable of achieving throughputs as those known for devices from the state of the art or described as advantageous because of the basic active principles of the separating process, in particular that of a non-ferrous metal fraction. So it is an integral part of the findings according to the invention that a significantly reduced throughput of bulk material is or can be accepted if it allows a multi-stage separation or sorting in an uninterrupted process or in immediately successive process steps to be realized without requiring additional transport means or feeders or any additional processing steps by operating personnel, such as storage and transport steps.

In the sorting device at hand, multi-stage sorting, in particular two-stage sorting, is ensured on the one hand by the trajectory separator device which separates the individual fractions of the bulk material based on their different kinetic properties alone, in particular based on trajectory properties or trajectories. On the other hand, successive or continuous multi-stage sorting is ensured by the roller which is disposed downstream of the trajectory separator device with respect to the trajectory of non-ferrous metals of the bulk material and which limits a sorting gap, the weight of the objects of the non-ferrous metal fraction ensuring automatic feeding of the objects to the roller and to the associated sorting gap at the roller, the roller and the at least one sorting gap limited by the at least one roller being disposed accordingly with respect to the trajectory separator device.

As indicated above, the proposed sorting device is suited in particular for cooperation with an eddy current separating device. In principle, however, a different separating device which allows the different fractions of the bulk material to be separated into different trajectories, in particular material-specific trajectories, so that at least a non-ferrous metal fraction can be separated by means of a trajectory separator device and can be supplied to the sorting gap limited by the at least one roller by the weight of the non-ferrous metal objects can interact with the sorting device.

Brush rollers can be used as rollers within the meaning of the present invention, if applicable. Alternatively, smooth or profiled rollers, such as rollers having a metallic surface or an elastomer surface, can be used. An electromechanical drive can preferably be used as a drive of the at least one roller. The trajectory separator device can preferably be a baffle that is movable or adjustable in the discharge hood in terms of position and orientation or a corresponding baffle plate. In addition, the trajectory separator device can have one or more baffle curtains made of rubber or a similar material, for example. The baffle plate can basically ensure the separating or sorting function between individual fractions of the bulk material, in particular the separation or sorting out of a non-ferrous metal fraction, which is why the adjustability or movability of the baffle plate is particularly advantageous in order to be able to achieve a clean separation or sorting that is as complete as possible. The baffle curtains, which serve as a boundary for the possible trajectories of the fractions of the bulk material in the broader sense, can be disposed on or in the discharge hood, in particular on or in the hood interior, both in a static and in a movable or adjustable manner.

According to a first advantageous embodiment of the sorting device, the axis of rotation of the at least one roller can extend parallel to an entry area of the discharge hood, in particular horizontally. This allows a particularly simple disposition of the at least one roller in the discharge hood. Additionally, this advantageously allows the sorting device according to the invention to be adjusted to the given dimensions of the entry area, in particular to the width of the entry area of the discharge hood, by adjusting the length of the axis of rotation and thus by adjusting the length of the roller to the width of the entry area of the discharge hood. Thereby, ideal adjustment of the sorting device to existing separating devices is achieved since the steplessly variable length of the axis of rotation of the at least one roller and the corresponding adjustment of the length of the roller itself allow free adjustment to the required dimensions of the discharge hood and thus to the required entry area of the discharge hood to the largest extent.

If the at least one axis of rotation of the roller is oriented parallel to the entry area of the discharge hood, in particular horizontally, this has the particularly advantageous effect that the non-ferrous metal objects or non-ferrous metal objects of the non-ferrous metal fraction that do not pass through the sorting gap or sorting gaps can be subjected to a force along the axis of rotation and thus also parallel to the entry area of the discharge hood and can be transported away. This allows non-ferrous metal objects that have not passed through the sorting gap or the sorting gaps to be discharged to a laterally disposed outlet opening in a side wall of the discharge hood.

Alternatively, the axis of rotation can also form an angle between 3° and 5° relative to the horizontal. It can be realized depending on the embodiment when the axis of rotation is oriented parallel or not parallel to the entry plane. When the axis of rotation slants to one side or is oriented obliquely, the dwelling time in the area of the sorting gap and the discharge speed of the non-ferrous metal objects can be influenced, thereby changing the sorting quality.

According to a preferred embodiment of the sorting device, the sorting gap can furthermore be limited by a roller and a baffle plate, in particular one made of stainless steel, of the trajectory separator device. In other words, this means that, in one embodiment, a single roller can form and limit a sorting gap together with a stainless steel baffle plate of the trajectory separator device. To achieve this, the axis of rotation of the roller has to have a corresponding distance from the baffle plate so that the sorting gap is formed between the surface of the roller and the surface of the baffle plate. This embodiment is advantageous in particular because of its simple constructive realization. Namely, a single roller is needed for the sorting gap or per sorting gap. Accordingly, the drive is also easier to realize in constructive terms because the drive or each drive has to drive only one roller. Moreover, the use of a baffle plate of the trajectory separator device as part of or as a one-sided limitation of the sorting gap or of a sorting gap has the advantage that the baffle plate, which is preferably made of stainless steel (austenitic steel), is highly durable or resistant to wear, which means that even slag residue adhering to the non-ferrous metal objects of the non-ferrous metal fraction, in particular the free lime contained in the slag, cannot damage or wear the baffle plate and thus the sorting gap at all or can only do so to a small degree. In particular, the adhesion of slag components to the baffle plate is very low, which means in particular that there is no risk of deposits continuously decreasing the height or the width of the sorting gap, thereby reducing or eliminating the effectiveness of the sorting-out, in particular the effectiveness of the sorting-out of coins from the non-ferrous metal objects.

In connection with this embodiment, a baffle curtain disposed above the baffle plate in the hood interior of the discharge hood can particularly advantageously be disposed closer to the entry area than the axis of rotation of the at least one roll. Disposing the baffle curtain in this way, in particular above the baffle plate, ensures that the entire non-ferrous metal fraction reaches the area of the roller and thus the area of the sorting gap. In addition, the roller, in particular the axis of rotation of the roller, can be moved, in particular displaced, together with the baffle plate, a constant sorting gap thus being formed between the baffle plate and the surface of the roller irrespective of how the baffle plate is positioned and oriented.

According to another particularly advantageous embodiment of the sorting device, the at least one roller can be mounted on both sides by means of bilaterally disposed bearing means, the bearing means being preferably disposed in such a manner that the axis of rotation of the at least one roller extends above a lower edge of the discharge hood. Bilateral mounting of the at least one roller by means of corresponding bearing means ensures high mechanical stability and thus a particularly desirable constancy of the height or the width of the sorting gap. Moreover, disposing the bearing means of a bilateral mount of the at least one roller in such a manner that the axes of rotation are disposed above a lower edge of the discharge hood makes sense additionally because it allows not only a compact design of the sorting device to be achieved but also sufficient space to be provided in particular below the sorting device for collecting and storing both the non-ferrous metal objects passing through the sorting gap and the non-ferrous metal objects not passing through the sorting gap.

As indicated above, it can be advantageous for the sorting device on the whole if the discharge hood has displacement means for changing the position of at least a baffle plate of the trajectory separator device. Primarily, the displacement means allow the baffle plate to be ideally adjusted to the bulk material entering the entry area of the discharge hood in terms of its position and its orientation so that the non-ferrous metal fraction can be separated or sorted out as cleanly as possible. To this end, the displacement means can be configured in such a manner, for example, that they allow the baffle plate to be displaced or moved translationally and to rotate about an axis of rotation. A baffle plate can also be provided with two plate elements connected by a joint, and the displacement means can allow the two plate elements to change their position relative to each other. In addition to the baffle plate, the at least one baffle curtain of the trajectory separator device can also be equipped with displacement means for changing the position of the baffle curtain, for example. In this way, too, optimized separation, in particular improved separation of the non-ferrous metal fraction from the bulk material, is achieved.

Likewise, as indicated above, the bearing means of the at least one roller can advantageously be connected to at least one baffle plate of the trajectory separator device in a separable manner, the discharge hood having displacement means for changing the position of the bearing means, and can be movable, in particular displaceable, in the hood of the interior of the discharge hood together with the at least one baffle plate when they are connected. The severable connection between the bearing means of the at least one roller and the baffle plate of the trajectory separator device has the effect that the sorting gap is realized or oriented ideally together with or relative to the baffle plate when they are connected and that independent movement and handling of the at least one roller and of the trajectory separator device, in particular of the baffle plate, is possible when they are not connected, allowing maintenance or cleaning work to be performed, for example. Realizing displacement means for changing the position of the bearing means of the at least one roller also has the effect that the orientation of the at least one roller and thus the position of the sorting gap can be ideally adjusted to the respective position and orientation of the baffle plate. When the bearing means of the roller and the baffle plate are connected, this particularly advantageously allows an ideal relative position to be achieved and maintained, in particular also when the position and/or the orientation of the baffle plate is changed. In this way, an ideal relative position between the baffle plate and the sorting gap or an ideal realization of the sorting gap can be ensured, for example.

In another preferred embodiment, the sorting device comprises a coin discharge device which is disposed below the at least one sorting gap, the coin discharge device preferably being configured in such a manner that the non-ferrous metal objects, in particular coins, passing through the at least one sorting gap are discharged in a coin discharge direction toward a side of the sorting device, in particular in a direction opposite to a non-ferrous metal discharge direction, in which the non-ferrous metal objects not passing through the at least one sorting gap are discharged from the sorting device.

In the proposed sorting device, the axis of rotation of the at least one roller can also advantageously extend perpendicular to an entry area of the discharge hood, in particular horizontally. In this context, it should be noted that when the sorting device is realized with more than one roller, preferably all axes of rotation of the respective roller axes are parallel to each other. The preferred orientation of the axis of rotation or of the axes of rotation perpendicular to the entry area of the discharge hood offers the advantage that it become possible to lead the components of the non-ferrous metal fraction not passing through the sorting gap out of the sorting device in an exit direction or a discharge direction, which is perpendicular to the entry area of the discharge hood but runs essentially parallel to the entry direction of the bulk material into the sorting device. This allows a particularly clean separation and a particularly effective sorting of the non-ferrous metal fraction to be achieved.

Also, the at least one sorting gap can advantageously be limited by at least two rollers, the drive of the rollers being configured in such a manner that at least two rollers rotate in opposite directions. By limiting or realizing the sorting gap by two adjacent rollers preferably having parallel axes of rotation, the discharge of non-ferrous metal objects not passing through the sorting gap is improved because, in this case, two rollers can subject the non-ferrous metal objects to a force leading away from the sorting gap. In addition, in particular if the advantageous opposite rotation is realized by means of the corresponding drive of the rollers, it is possible to prevent objects from getting stuck in the sorting gap and thus to prevent blockage of the rollers or of the one roller. This applies in particular to non-ferrous metal objects having a wedge-shaped contour, which could otherwise cause the non-ferrous metal objects to have a wedging effect in the area of the sorting gap, which could even be amplified by the respective rotation of the axis of the roller, possibly increasing the wedging effect to the point that one roller or even both rollers stand still.

Accordingly, it is particularly advantageous in this context if the opposite rotation of the axes of rotation of the at least two rollers forming or limiting a sorting gap is configured in such a manner that, at least tangentially, both roller surfaces rotate at least partially opposite to the direction of the weight vector in the area of the sorting gap. In other words, this means that the opposite rotation of the rollers forming or limiting a sorting gap is configured in such a manner that the roller surfaces and their movement in the area of the narrowing and in the area of the sorting gap also subject the objects, in particular non-ferrous metal objects, entering said area to a force against the weight so far as there is contact between the roller surface and the non-ferrous metal objects. As described above, this effectively prevents the disadvantageous wedging effect. Another application of force can be realized by providing the surface of the at least one roller with a profile, for example, so that a force parallel to the axis of rotation is also exerted on the non-ferrous metal objects.

Alternatively, the rollers can be driven in such a manner that all rollers rotate in the same direction. This can be realized by means of a shared drive. In this case, long parts can also be sorted out from the non-ferrous metal fraction.

In addition, the rollers can preferably be brush rollers, the brush rollers further preferably having bristles of different lengths. Brush rollers having bristles of two or more different lengths are particularly preferred. They can preferably be disposed in such a manner that the bristles of the same length are combined in groups or bundles. Furthermore, these groups or bundles can be disposed in such a manner that the one type of bristles of one length, preferably of the greatest length, form a spiral on the roller or on the roller surface.

Further preferably, the brush rollers can also have a shaft and a bristle support which can be attached to the shaft for co-rotation and which can be separated from the shaft. Particularly preferably, a number or plurality of bristle support elements can be provided, which are then combined to form a bristle support. To this end, the bristle support elements can have connecting means at the axial ends, such as a serration, for connecting the bristle support elements to each other and/or to a roller shaft in a force-fitting manner.

The use of brush rollers has an advantageous effect when sorting out the coins. Also, brush rollers allow bundles of thin copper wire to be sorted out, especially when the rollers rotate in the same direction. The brush rollers having different bristle lengths have proven advantageous for sorting coins and for additionally sorting long parts, in particular when all rollers rotate in the same direction. The long parts are essentially discharged perpendicularly to the axes of rotation of the rollers and can be collected in a container accordingly disposed laterally. Realizing a bristle support or bristle support elements which can be combined to form a bristle support means has the effect that not the entire brush roller but only a part thereof has to be exchanged or replaced in the event of damage or wear.

In order to produce a coin concentrate or a concentrate of coins of highest possible quality consisting of the metal objects which pass through the sorting gap or the at least one sorting gap, it is particularly important to configure the width of the sorting gap as ideally as possible. Preferably, the sorting gap or the sorting gaps are essentially formed by the shorter or shortest bristles of adjacent brush rollers. According to an advantageous embodiment of the device, the adjacent brush rollers are accordingly disposed relative to each other in such a manner that a distance of 2 to 7 mm, preferably of 3 to 6 mm, is formed between the shortest bristles of adjacent rollers. This allows a coin concentrate to be produced that has a high content of coins and only a relatively low content of other flat parts.

Furthermore, it has proven advantageous if parts or the sorting gap or of the sorting gaps, i.e., the area between the opposite shortest bristles of the brush rollers, are also combed by the longer bristles. However, it has proven particularly advantageous in this context if the longer or longest bristles of a respective roller and the shortest bristles of a respective adjacent roller do not meet or even mesh. Instead, according to a particularly advantageous embodiment of the invention, adjacent brush rollers are disposed relative to each other in such a manner that there is always a distance of 0.5 mm to 1.5 mm, preferably of 0.8 mm to 1.2 mm, between the longest bristles of one roller and the shortest bristles of an adjacent roller. This distance refers to the situation in which the respective shortest and longest bristles facing each other are essentially oriented parallel to each other, i.e., at about the height of the axis of rotation of the respective rollers when the shortest and longest bristles face each other in this situation.

This distance or this definition of the distance also applies to the above-mentioned design of the distance between shortest bristles of adjacent brush rollers.

In another embodiment, adjacent brush rollers can be disposed relative to each other in such a manner that a preferably constant distance of less than 45 mm, preferably less than 42 mm, particularly preferably less than 40 mm, is formed between the longest bristles of adjacent rollers in the direction of the axes of rotation. The term constant as used here is supposed to be understood as constant over time. This means that the distance of the longest bristles should not change during rotation. Especially when the longest bristles form spiral portions or spirals, this maximum distance between the longest bristles in the longitudinal direction or in the direction of the axes of rotation can be easily set.

The distance can alternate, meaning that a greater distance is followed by a smaller distance, none of the distances exceeding the maximum distance. The difference between the adjoining distances in the longitudinal direction can have an impact on the discharge speed in the longitudinal direction and can be advantageously set for each application. By complying with the maximum distance, another "sorting dimension" can be established in a particularly advantageous manner. Namely, only flat parts that are not broader or thicker than the sorting gap in any place in one dimension and that are not longer or bigger than 45 mm, preferably 42 mm, particularly preferably 40 mm, in an essentially vertical second dimension can pass through the sorting gap. However, this also has the effect that all objects passing through the sorting gap have dimensions very similar to those of the coins to be sorted out. Consequently, the advantageous relative disposition of the longest bristles of adjacent rollers in the longitudinal direction or in the direction of the axes of rotation leads to a further increase in quality of the sorted-out coin concentrate.

According to one embodiment, the brush rollers can be fixed on a support device, such as a frame device. In this case, the corresponding distances of the axes of rotation and the corresponding distances of the roller shafts are fixed or set and cannot be changed. In this case, said distances, i.e., the distance between shortest bristles and the distance between shortest bristles and longest bristles can be adjusted or varied by placing different bristle supports or bristle support elements having bristles adjusted accordingly, in particular having bristles adjusted accordingly in length, on the rollers, in particular on the roller shafts. In an alternative embodiment, however, the rollers or brush rollers themselves can be changed in terms of their position on a substructure, i.e., on a frame, and can be fixed in their changed position, which means that the distances can be changed without replacing the bristle support or the bristle support elements by changing a position of the brush rollers on the whole.

In order to produce a particularly high-quality or pure coin concentrate, it has proven advantageous if the brush rollers, in particular the bristles of the brush rollers that are the most common on a brush roller, define an outer diameter of the brush roller that is adjusted to the spectrum of the diameters of the coins to be sorted out. This is because, in a certain area, the outer contour or the essential part of the surface of the brush rollers is curved, helping the coins to be sorted out to stand up or become upright by the rotation of the rollers. Accordingly, an advantageous embodiment envisages that the rollers have an outer diameter that is selected in such a manner that coins conveyed against the rollers are moved in the direction of the sorting gap by the rotation of the rollers and are stood up in the process, said outer diameter being preferably defined by the shortest bristles. Preferably, the outer diameter of the brush rollers can be 10 cm to 30 cm, preferably 15 cm to 28 cm.

In addition, it can also be advantageous if the brush rollers are attached to a frame or are accommodated in a frame, which is preferably U-shaped and thus open on one side. Such a frame offers the necessary basic stability for the brush rollers to be disposed and attached. Moreover, a frame open on one side, which is formed by three adjacent legs in the shape of a U, for example, allows the frame of the brush rollers to be open on the side opposite to where the brush roller is mounted, thus preventing wedging, build-up or jamming of discharged metal objects of the bulk metal.

Spoons are a typical example of metal objects whose spoon handle can get into the area between the brush rollers, i.e., into the area of sorting gap, and which can lead to wedging and build-ups at the discharge end of the brush rollers, which can be prevented, however, by open disposition of the roller ends and/or of the frame.

In another particularly advantageous embodiment of the sorting device, the sorting device comprises four, preferably six, particularly preferably eight rollers and the bearing means of the rollers are realized in such a manner that a parallel, v-shaped or u-shaped disposition of the rollers and/or of the axes of rotation of the rollers is achieved. Particularly preferably, three or five or seven sorting gaps are formed between the four or six or eight rollers, each sorting gap being limited or formed by two adjacent rollers. Advantageously, two adjacent rollers, in particular two middle rollers, rotate in opposite directions, both rollers subjecting the non-ferrous metal objects coming into contact with the rollers to a force against the weight or against the weight vector, also away from the sorting gap. In addition, the four or six or eight rollers can form two groups of rollers, such as a left and a right roller group, the rollers of one roller group each rotating in the same direction of the axes of rotation and comprising corresponding drive means for that purpose.

By disposing the rollers in a v-shape or u-shape via the corresponding design and disposition of the bearing means on or in the discharge hood, an improvement of the sorting process can be achieved in a particularly advantageous manner, in particular together with an improvement of the discharge of the objects not passing through the sorting gaps. Preferably, the four, preferably six, particularly preferably eight rollers in total can all have shared bearing means, such as shared bilateral bearing rails or bearing supports, which are disposed and attached on or in the discharge hood of the sorting device. Furthermore, by orienting the rollers parallel, in particular by orienting the axes of rotation of the rollers parallel, a constant width or height of the respective sorting gaps is achieved. However, this only applies to the constant height or the constant width of exactly one sorting gap formed or limited by two rollers. However, the distances between the rollers or the distances between the axes of rotation of the rollers can also be varied, sorting gaps having constant widths or heights per se but different width or heights compared to other sorting gaps being realized. In this way, too, the sorting function of the sorting device can be improved further.

When brush rollers are used, it may be particularly advantageous if the axes of rotation of all brush rollers are disposed in the same plane. The plane can be both horizontal and inclined along the axes of rotation. An inclination affects the advancement of the objects to or between the rollers. An inclination of up to 20° relative to the horizontal can be provided.

According to another particularly preferred embodiment, a shared drive can be provided for at least two, preferably four, particularly preferably six or eight rollers, opposite rotation of at least two rollers being achievable by means of a gear mechanism connected to the drive. The shared drive of multiple rollers, in particular the shared drive of all rollers, allows a constructively simple realization of the sorting device using known drive technology and or transmission technology. Preferably, as described above, two rollers, in particular two middle rollers, can rotate in opposite directions in such a manner that objects coming in contact with the rollers in the area of the roller gap are at least partially subjected to a force opposite to the weight of the objects in order to prevent objects from becoming wedged or jammed in the area of the sorting gap or in the sorting gap. The rotation of groups of rollers in the same direction can ensure, in particular for the realization of a v-shaped or u-shaped disposition of the rollers, that an even material distribution of the non-ferrous metal objects across all rollers and across all sorting gaps is achieved. To this end, a right roller group can rotate in the clockwise sense, while a left roller group rotates in the counterclockwise sense. The shared drive can also preferably be used to achieve this rotation. In this case, the drive can advantageously comprise two opposite drives, for example, each drive driving the middle rollers, which are in particular disposed in a v-shape or a u-shape, in opposite directions and the remaining two or four rollers being driven indirectly by the drive of the first or middle rollers via a chain control, a toothed belt drive or the like, for example, based on the middle rollers, allowing the rollers on a right or left side or on a right or left leg of a u-shape or a v-shape to be rotated in the same direction.

According to another particularly preferred embodiment of the sorting device, the drive of the at least one roller can be disposed on a side of the at least one roller facing the entry area of the discharge hood, in particular within the hood interior. This leads to a compact design of the sorting device in a particularly advantageous manner. Additionally, the drive is protected from negative external conditions or damage, in particular if the drive is disposed within the hood interior. If the drive is disposed within the hood interior of the discharge hood, the trajectory separator device can preferably comprise means that shield the drive or the drive unit from the trajectory of objects entering the discharge hood, in particular from slag parts. To this end, another baffle curtain or a baffle plate which shields or protects the drive or the drive unit can be disposed on a side facing the entry area of the discharge hood. Furthermore, the drive can be disposed on and/or attached to a bearing means for mounting the rollers.

Likewise, narrowing means can be disposed above the at least one roller, in particular above the rollers, preferably perpendicular to the entry area of the discharge hood, non-ferrous objects coming from the trajectory separator device thus being directed in the direction of a central longitudinal axis of the discharge hood. For example, angular plates or profile plates made of stainless steel, for example, can be used as narrowing means. The narrowing means preferably ensure that all non-ferrous metal objects entering the entry area are directed into the area of the rollers and thus into the area of the at least one sorting gap. This has the effect that all entering non-ferrous metal objects are guided into the area of the sorting gaps or into the area of the sorting gap and are thus subjected to sorting, in particular to sorting-out of coins, even when an entry area is correspondingly large.

Particularly preferably, the narrowing means each end at least above an axis of rotation of an outer roller on the side of the rollers. This ensures that the non-ferrous metal objects are reliably fed to the sorting gap or the sorting gaps. Additionally, wedging of non-ferrous metal objects between an outer roller and another limiting part, such as a wall part of the discharge hood, cannot cause jamming or blockage of the rollers.

Likewise, narrowing means by means of which non-ferrous objects, in particular coins, passing through the sorting gap or the sorting gaps are directed toward a shared ejection gap can be disposed below the rollers of the sorting device. The narrowing means disposed below the rollers protect the non-ferrous objects, in particular coins, passing through the sorting gap or the sorting gaps especially against unauthorized access. This is necessary because the non-ferrous objects, in particular coins, passing through the sorting gap or the sorting gaps have a value, in particular a coin value, that is significantly higher than the material value of the coins. Accordingly, the coin concentrate produced by the sorting gap or the sorting gaps is of considerable value. However, this also leads to the need to protect the coin concentrate against unauthorized access. To make this possible, a receiving container or a storage container for the coin concentrate which merely has a narrow entry gap or a narrow entry opening can be provided below the sorting side or at the exit of the sorting device. In order to allow ideal feeding and to also avoid access to the coin concentrate as far as possible or to make it more difficult between the sorting device and the receiving or storage container, the advantageously provided narrowing means can be disposed below the rollers and direct the non-ferrous objects, in particular coins, passing through the sorting gap or the sorting gaps toward a shared ejection gap.

Particularly preferably, the narrowing means disposed below the rollers can be realized in such a manner that the weight of the non-ferrous objects, in particular coins, passing through the sorting gap or the sorting gaps enable exit from the from the ejection gap. In a particularly advantageous manner, this means that no conveying means or conveyor has to be provided in order to feed the coin concentrate or the sorted-out non-ferrous objects to a collecting device or a storage container. In other words, this means that even when such narrowing means are provided, the objects, in particular coins, sorted out by the sorting gap or the sorting gaps can be discharged automatically, said discharging being effected or supported only by the weight of said objects.

Particularly preferably, the sorting device can additionally comprise two identical roller assemblies disposed side by side, each roller assembly comprising at least two, preferably four, particularly preferably six or eight rollers having corresponding bearing means and each roller assembly comprising in particular its own independent drive, which preferably drives two rollers of the respective roller assembly directly. Particularly preferably, the bearing means of the roller assembly can be u-shaped or v-shaped.

The present invention also relates to an eddy current separating device comprising a feeder, in particular a conveyor belt, which is configured to convey bulk material, the eddy current separating device, in particular the feeder, comprising an eddy current device which is disposed at the end of the feeder and which selectively influences the trajectory of non-ferrous objects of the bulk material after they have left the feeder, the eddy current separating device having attachment means for attaching a discharge hood disposed downstream of the feeder in the feeding direction and being characterized according to the invention by the fact that it comprises a sorting device as described above.

With the eddy current separating device according to the invention, several particularly advantageous effects are realized at once. First, the configuration and effect of the sorting device described above allows a coin concentrate to be produced or generated from bulk material using a single feeder, namely the feeder of the eddy current separating device. In this way, according to the invention, a multi-stage sequential sorting is achieved which at least also leads to production of a coin concentrate. This significantly reduces wear and thus repair and maintenance work, as described above. Also, the amount of personnel and the number of bearing means and storage areas or storage volume required is reduced significantly. Another particular advantage is that basically any known eddy current separating device can be easily retrofitted or equipped with the sorting device described above, essentially simply by replacing an existing discharge hood with the discharge hood of the sorting device described above or by using the latter.

According to a particularly advantageous embodiment of the eddy current separating device, it can have a frame for spacing the eddy current separating device from a ground, the frame being realized in such a manner that a distance of at least 40 cm, preferably at least 60 cm, particularly preferably at least 80 cm exists or is achieved between an outlet of the at least one sorting gap, in particular between a narrowing means disposed below the rollers, and the ground. In a particularly advantageous manner, this means that the non-ferrous objects, in particular coins, passing through the sorting gap or the sorting gaps are guided into or drop into a collecting and/or storage container disposed below the eddy current separating device, in particular below the sorting device, without having to provide additional transport or conveying means, simply by exploiting the weight of said objects. Thus, the coin concentrate can be collected and safely stored in a particularly advantageous manner without additional constructive measures having to be taken that go beyond the provision of a corresponding container.

According to another particularly preferred embodiment of the eddy current separating device, the at least one sorting gap can have a passage plane in which non-ferrous objects, in particular coins, can pass through the sorting gap, the passage plane having at least a vertical component which is perpendicular to a feeding plane of the feeder of the eddy current separating device. In a particularly advantageous manner, this means that the kinetic energy and the potential energy that the non-ferrous metal fraction receives from the feeder, the eddy current device and, if applicable, the height of the feeder is sufficient for the non-ferrous metal fraction to be fed to the sorting gap or the sorting gaps and to pass through the sorting gap, if applicable, without the need for additional conveyors. In other words, this means that the kinetic energy and/or the potential energy that the non-ferrous metal fraction has when leaving the feeder of the eddy current separating device is sufficient for the non-ferrous metal fraction to reach the at least one sorting gap and that, moreover, the orientation of the sorting gap is defined by the passage plane in such a manner that passage through the sorting gap can take place based on the kinetic and potential energy, in particular without additional acceleration by a transport device or conveyor. Expressed in negative terms, this means that the passage plane of the at least one sorting gap does not extend in a horizontal plane, in particular in a horizontal plane parallel to the feeding plane.

In another particularly advantageous embodiment of the eddy current separating device, the at least one sorting gap has a passage plane in which non-ferrous objects, in particular coins, can pass through the sorting gap, the passage plane being perpendicular to a feeding plane of the feeder. This ensures in a particularly advantageous manner that the non-ferrous objects, in particular coins, pass through the sorting gap or the sorting gaps mainly or essentially because of the weight or the potential energy of the non-ferrous objects or coins.

The present invention also relates to a sorting device as described above for sorting out coins from bulk material, in particular using an eddy current separating device.

Moreover, the present invention relates to the use of an eddy current separating device as described above for sorting out coins from bulk material.

Other advantages, features and details of the invention are apparent from the following description of preferred embodiments and from the drawings schematically showing the subject matters of the invention.

DETAILED DESCRIPTION

In the following description, an application of the subject matter of the invention for recovering coins from slag via an intermediate sorting step of a non-ferrous metal fraction comprising the coins is described. However, the devices according to the invention can also be operated with other bulk materials, the advantages and enhancements according to the invention being realized as well. For example, the device can also be operated with bulk metal from vehicle recycling, for example. Coins can also be recovered from bulk heavy metal. Likewise, coins can be effectively recovered from pre-sorted, largely pure bulk non-ferrous metal using the devices described, the non-ferrous metal fraction being additionally concentrated.

Figure 1:
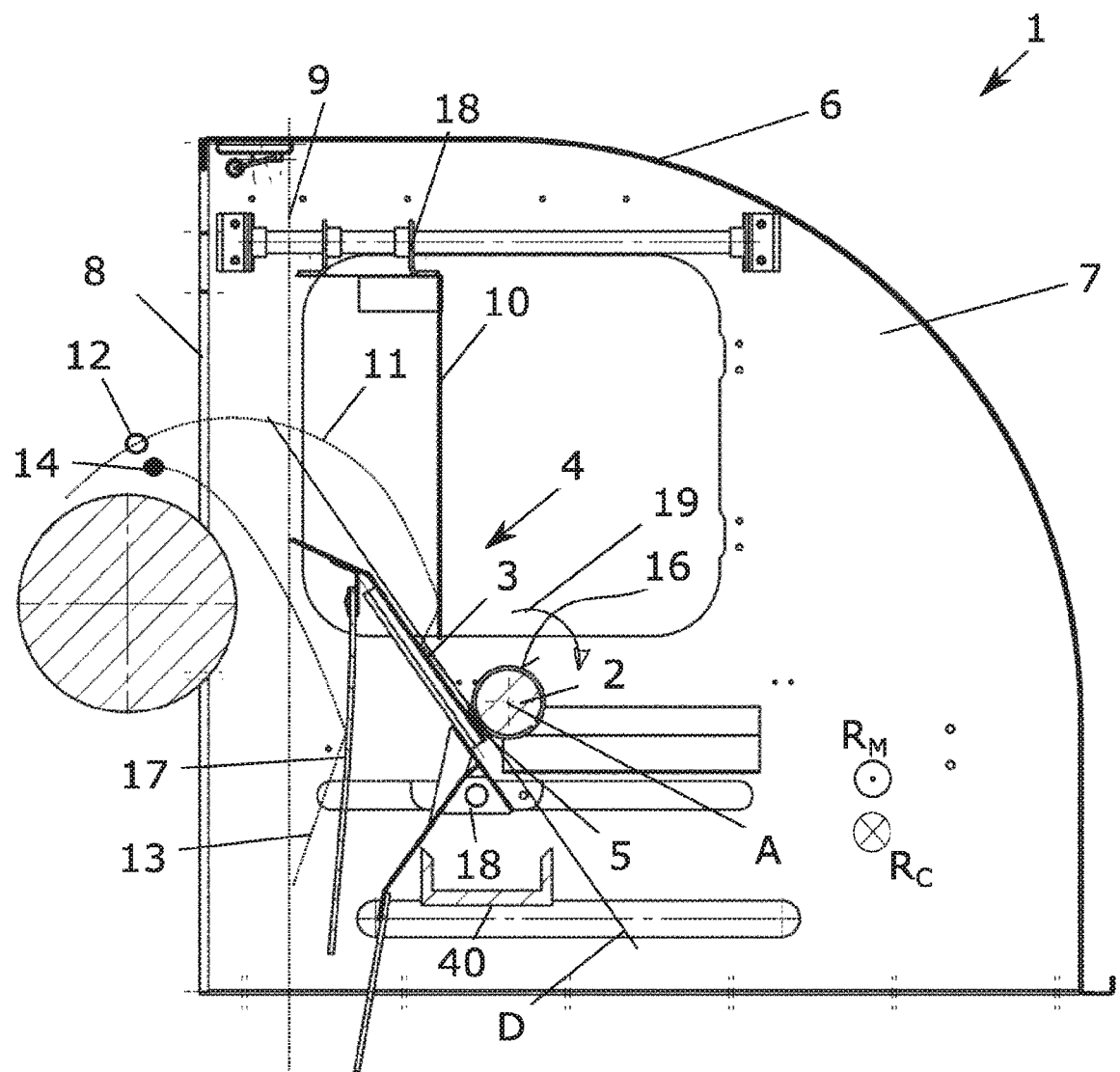
FIG. 1 is a lateral section view of a first embodiment of a sorting device according to the invention.

FIG. 1 shows a sorting device 1 in which a sorting gap 5 is realized between a roller 2 and a baffle plate 3 of a trajectory separator device 4. Trajectory separator device 4 and roller 2 are disposed within a discharge hood 6, i.e., in a hood interior 7 of discharge hood 6. Discharge hood 6 comprises an entry area 8 which is or extends perpendicular to the drawing plane in the illustration of FIG. 1 and through which slag or waste incineration slag can be introduced into discharge hood 6. By means of a separating device, such as an eddy current separating device not illustrated in FIG. 1, disposed upstream of sorting devices 1, the slag entering entry area 8 of sorting device 1 is given different trajectories depending on the material or the material properties. For example, the trajectory or the trajectories of non-ferrous objects are introduced into sorting device 1 through entry area 8 in such a manner that they pass through a separator area 9, which extends parallel to entry area 8, above the baffle or baffle plate 3 of trajectory separator device 4. Likewise, other fractions contained in the slag, such as slag, pass through separator area 9 below baffle plate 3. Baffle curtain 10 disposed above baffle plate 3 ensures that the non-ferrous metal objects of a non-ferrous metal fraction are fed to roller 2 and to sorting gap 5 formed between roller 2 and baffle plate 3 largely irrespective of the actual trajectory of the non-ferrous metal objects. An exemplary trajectory 11 shows a possible trajectory of an exemplary non-ferrous metal object 12. A second exemplary trajectory 13 shows a trajectory of a slag object 14. In the event that the non-ferrous metal object 12 is thin enough or narrow enough in at least one dimension, it can pass through the sorting gap between baffle plate 3 and roller 2 mounted to rotate about axis of rotation A and can be guided into receiving container or storage container 15. However, a non-ferrous metal object 12 that cannot pass through sorting gap 5 in any dimension or spatial direction will be subjected to a force in a direction perpendicular to the drawing plane of FIG. 1 by roller 2, in particular by a structure of surface 16 of roller 2.

As is made clear by FIG. 1, in particular by the illustration of trajectory 11 of non-ferrous metal object 12, roller 2 is disposed relative to trajectory separator device 4 in such a manner that a non-ferrous metal fraction separated off by trajectory separator device 4 is guided in the direction of sorting gap 5 by the weight of the non-ferrous metal objects. In the example shown in FIG. 1, axis of rotation A of roller 2 is disposed parallel to entry area 8 of discharge hood 6. Moreover, axis of rotation A of roller 2 extends horizontally. Notwithstanding the illustration of FIG. 1, axis of rotation A of profiled roller 2 can also be inclined by 3° to 5° in the discharge direction of the non-ferrous metal objects not passing through sorting gap 5. Baffle plate 3 of trajectory separator device 4 is preferably made of stainless steel, in particular of austenitic steel, so as to avoid adhesions and reduce wear. Moreover, the selection of austenitic steel is particularly advantageous because it prevents undesired magnetization of the baffle plate during interaction with an eddy current separating device. Trajectory separator device 4, in particular baffle plate 3, baffle curtain 10 and additional baffle curtains or rubber curtains 17 connected to baffle plate 3 are disposed or mounted so as to be movable in discharge hood 6, in particular within hood interior 7, by means of displacement means 18. Thus, the position and/or the orientation of trajectory separator device 4 and its components can be varied or adjusted independently or cumulatively.

Roller 2 of sorting device 1 can have bearing means (not shown in FIG. 1), in particular bilaterally disposed bearing means or bearing means effecting bilateral mounting. The bearing means are preferably connected at least to baffle plate 3 of trajectory separator device 4, in particular to displacement means 18 of baffle plate 3, in a separable manner, discharge hood 6 preferably also having displacement means (not shown in FIG. 1) for changing the position of the bearing means of roller 2. This allows the bearing means of the roller to be moved together with bearing means 18 of the baffle plate when they are connected.

Roller 2 can have bearing means 18 that allow bilateral mounting preferably within hood interior 7 of discharge hood 6. Preferably, the bearing means or bilateral bearing means of roller 2, which are not shown separately in FIG. 1, can be mobile or movable. Particularly preferably, the bearing means are provided with displacement means or connected to displacement means which allow the position of the bearing means to be changed. For example, this allows roller 2 to be moved translationally within hood interior 7 of discharge hood 6. Moreover, the displacement means of the bearing means of roller 2 can be advantageously connected to displacement means 18 of trajectory separator device 4 in a couplable or separable manner, allowing baffle plate 3 or trajectory separator device 4 and roller 2 to be moved together, in particular to be displaced together, by means of the respective displacement means when roller 2 or its bearing means are connected to trajectory separator device 4, in particular to baffle plate 3. Thus, trajectory separator device 4, in particular baffle plate 3, can be ideally adapted to the respective trajectory properties of the objects entering through entry area 8, thereby achieving ideal separation or sorting out of a non-ferrous metal fraction while sorting gap 5 between baffle plate 3 and roller 2 remains unchanged itself even when the position of roller 2 is changed together with baffle plate 3 and/or trajectory separator device 4. When the severable connection between trajectory separator device 4 and roller 2, in particular via a coupling of the respective displacement means, is severed, maintenance can preferably be performed, sorting gap 5 can be adjusted or other independent movements of trajectory separator device 4 and roller 2 can be executed. In the example of FIG. 1, the drive (not illustrated in FIG. 1) of roller 2 for rotating roller 2 about axis of rotation A is configured in such a manner that roller 2 rotates about axis A in the clockwise sense, as outlined by directional arrow 19 in FIG. 1. Said clockwise rotation prevents the non-ferrous metal objects guided in the direction of the sorting gap by their weight from becoming wedged in the area of sorting gap 5 between baffle plate 3 and roller 2.

By means of directional arrows which are perpendicular to the drawing plane, FIG. 1 shows coin discharge direction $R_C$ and metal discharge direction $R_M$, which run in opposite or contrary directions in the example of FIG. 1. Coin discharge direction $R_C$ is essentially defined by coin discharge device 40. Metal discharge direction $R_M$ is essentially defined by direction of rotation 19 of roller 2 and by the profile of surface 16 of roller 2.

Figure 2:
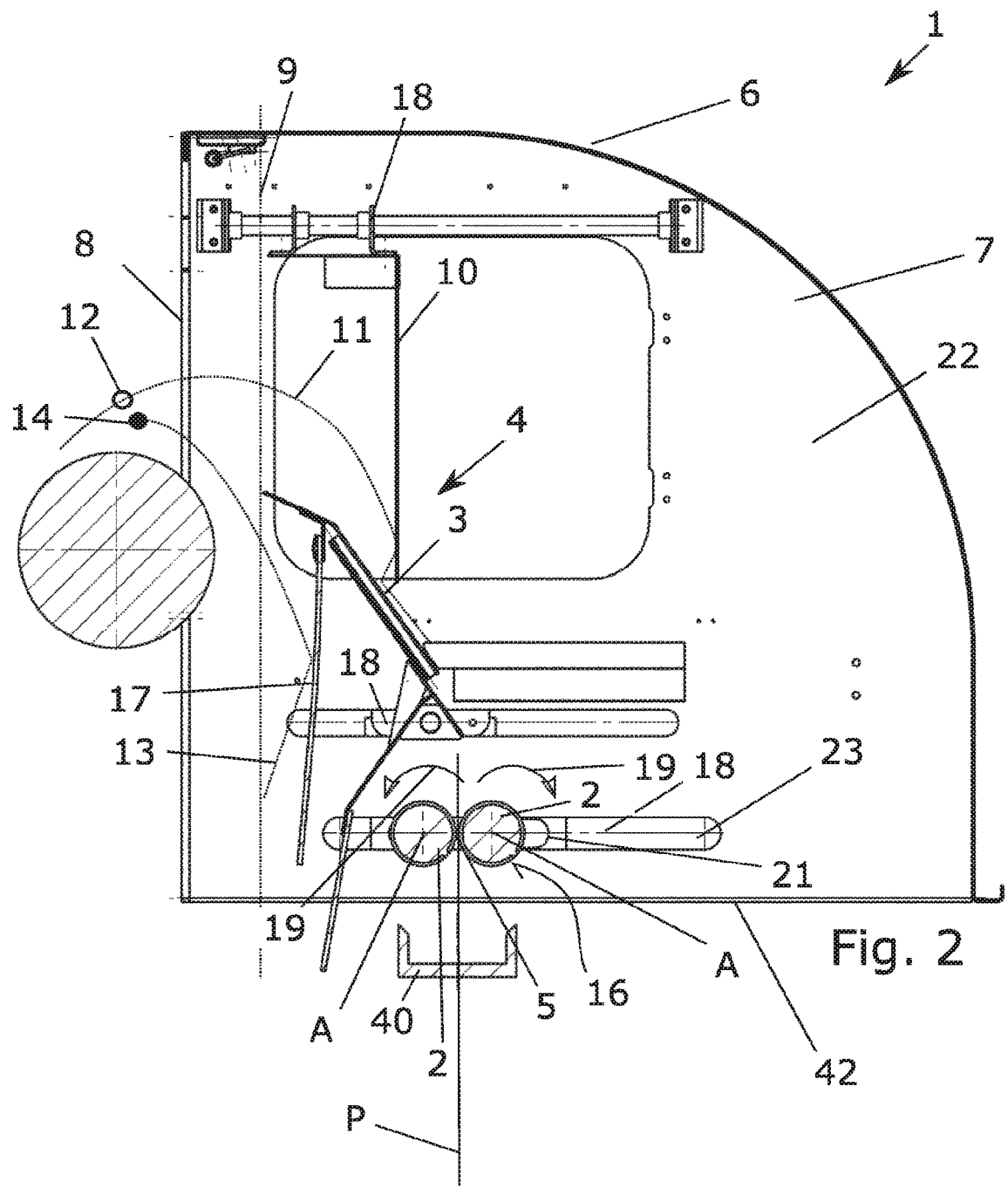
FIG. 2 is a lateral section view of a second embodiment of a sorting device according to the invention.

FIG. 2 also shows a sorting device 1 according to the invention in which a trajectory separator device 4 is disposed within hood interior 7 of a discharge hood 6. The essential difference between the illustration of FIG. 1 and the illustration of FIG. 2 is that the embodiment of FIG. 2 has two rollers 2, whose parallel axes of rotation A run parallel to entry area 8 and horizontally. As described with reference to FIG. 1, axes of rotation A can be inclined by 3° to 5° relative to the horizontal in order to promote discharge of the non-ferrous metal objects not passing through sorting gap 5. Thus, a sorting gap 5 is limited or formed by the two rollers 2 on both sides. Likewise, a vertical passage plane P is thus formed, which is additionally perpendicular to the drawing plane. Pair of rollers 20 comprises the two rollers 2 and is mounted in or on side walls 22 of the discharge hood 6 by bilateral mounting means 21 at the two ends of rollers 2 or on the axes of rotation of rollers 2, mounting means 21 comprising displacement means 18 which allow movement of rollers 2, in particular displacement of pair of rollers 20, along oblong holes 23 formed in side walls 22. Owing to a severable connection (not shown in FIG. 2) between displacement means 18 of pair of rollers 20 and displacement means 18 of trajectory separator device 4, in particular of baffle plate 3, joint adjustment or movement, in particular joint displacement, of trajectory separator device 4 and pair of rollers 20 can be achieved. This joint displacement in the connected state of the severable connection ensures that, irrespective of the positioning and orientation, if applicable, of trajectory separator device 4, in particular of baffle plate 3, rollers 2 of pair of rollers 20 are each disposed relative to trajectory separator device 4 in such a manner that a non-ferrous metal fraction separated off by trajectory separator device 4 is guided in the direction of sorting gap 5 by the weight of the non-ferrous metal objects. Thus, using sorting device 1 according to the second embodiment of FIG. 2, it is also ensured that slag entering entry area 8 does not only easily achieve separation of a non-ferrous metal fraction without additional conveyors or transport means as far as the trajectory has a material-specific property or path, but that it also allows feeding to sorting gap 5 and thus the possibility of sorting out coins or similarly shaped objects from the non-ferrous metal fraction by nothing more than the weight of the non-ferrous metal objects.

As can be seen from FIG. 2, all axes of rotation A are disposed above a lower edge 42 of discharge hood 6, a compact design with sufficient space at the bottom for disposing coin discharge device 40, for example, being achieved.

Exemplary trajectory 11 of a non-ferrous metal object 12 makes clear how the uninterrupted multi-stage sorting process takes place within sorting device 1. Objects, in particular coins, that can pass through sorting gap 5 are transported onto coin discharge device 40, again solely by their weight. Coin discharge device 40 can be realized by a vibrating channel or a conveyor belt, for example. Non-ferrous metal objects that cannot pass through sorting gap 5 are subjected to a force away from sorting gap 5 by rollers 2 of pair of rollers 20, in particular because of a surface structure of surfaces 16 of rollers 2, not least by rotation of rollers 2 about axis of rotation A. In the example of FIG. 2, objects not passing through sorting gap 5 are subjected to a force perpendicular to the drawing plane as in FIG. 1, i.e., along axis of rotation A. Accordingly, objects not passing through sorting gap 5 are discharged past the rollers in direction of rotation 19 of the rollers or along axes of rotation A of rollers 2 in the direction of and, if applicable, through side walls or side wall 22 of discharge hood 6.

Figure 3:
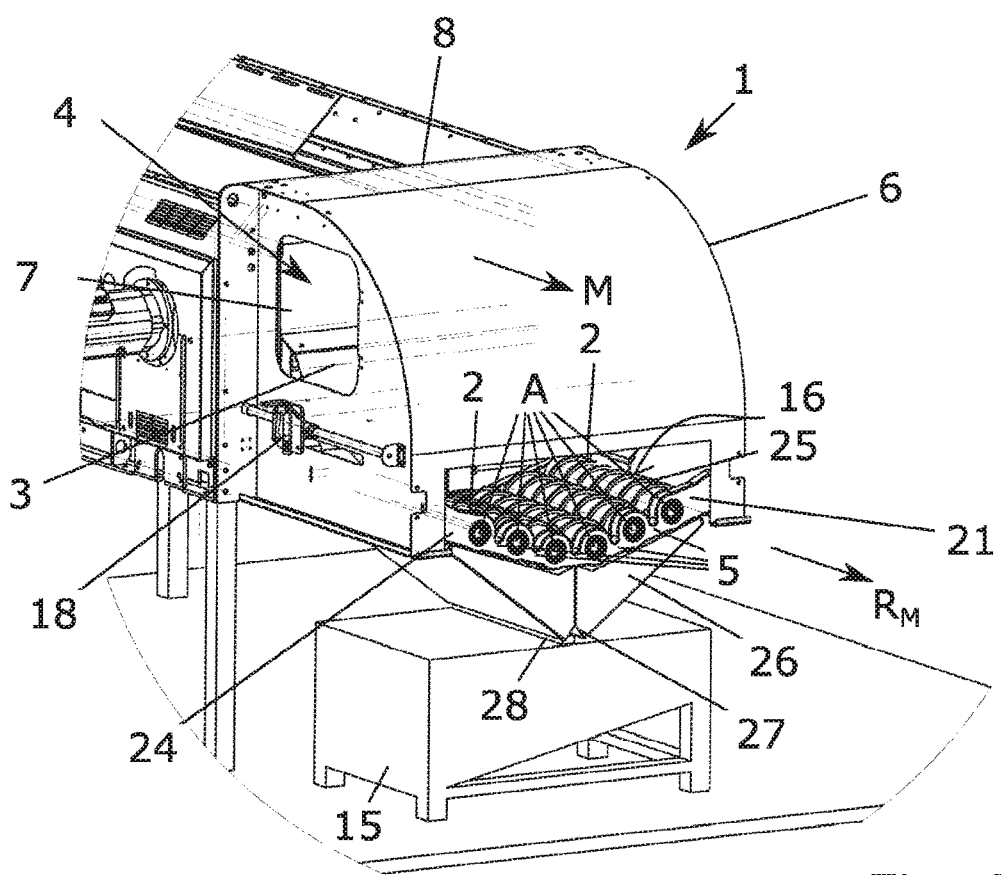
FIG. 3 is a perspective view of a third embodiment of a sorting device according to the invention.

FIG. 3 shows a third embodiment of sorting device 1 according to the invention. Contrary to the sorting devices of FIGS. 1 and 2, axes of rotation A of the total of six rollers 2 are disposed perpendicular to entry area 8 of discharge hood 6. Bearing means 21 bilaterally disposed at the roller ends, i.e., at the axial roller ends, are realized as bearing brackets or bearing supports 24. Bearing supports 24 are configured in such a manner that rollers 2, and in particular also axes of rotation A of rollers 2, are disposed in a v-shape relative to each other. In the illustration of FIG. 3, profile 25 of surface 16 of rollers 2 is visible, which ensures that objects that cannot pass through sorting gaps 5 formed between rollers 2 are subjected to a force in a discharge direction R away from sorting gaps 5 by the rotation of rollers 2 by means of a drive not illustrated in FIG. 3. Axes of rotation A of rollers 2 can either extend horizontally or be inclined by 3° to 5° relative to the horizontal in metal discharge direction $R_M$ or in the conveying direction in this embodiment, too. The non-ferrous metal objects, in particular coins, passing through sorting gaps 5 are narrowed or directed toward a shared ejection gap 27 by narrowing means 26 disposed below rollers 2, the non-ferrous metal objects, in particular coins, being able to reach storage containers 15 disposed below sorting device 1, storage container 15 itself having only a narrow entry gap 28, thus protecting the coin concentrate in storage container 15 against unauthorized access.

In order to feed sorting gaps 5 with a non-ferrous metal fraction that is as pure as possible, a trajectory separator device 4, in particular having a baffle plate 3, is provided within hood interior 7 of discharge hood 6 in the embodiment of FIG. 3, as well, which means that, using a separating device which is disposed upstream of sorting devices 1 and which establishes a material-specific trajectory of objects and components of slag, in particular waste incineration slag, only non-ferrous metal objects pass trajectory separator device 4 above baffle plate 3 and are subsequently guided in the direction of sorting gaps 5 by their weight.

Figure 4:
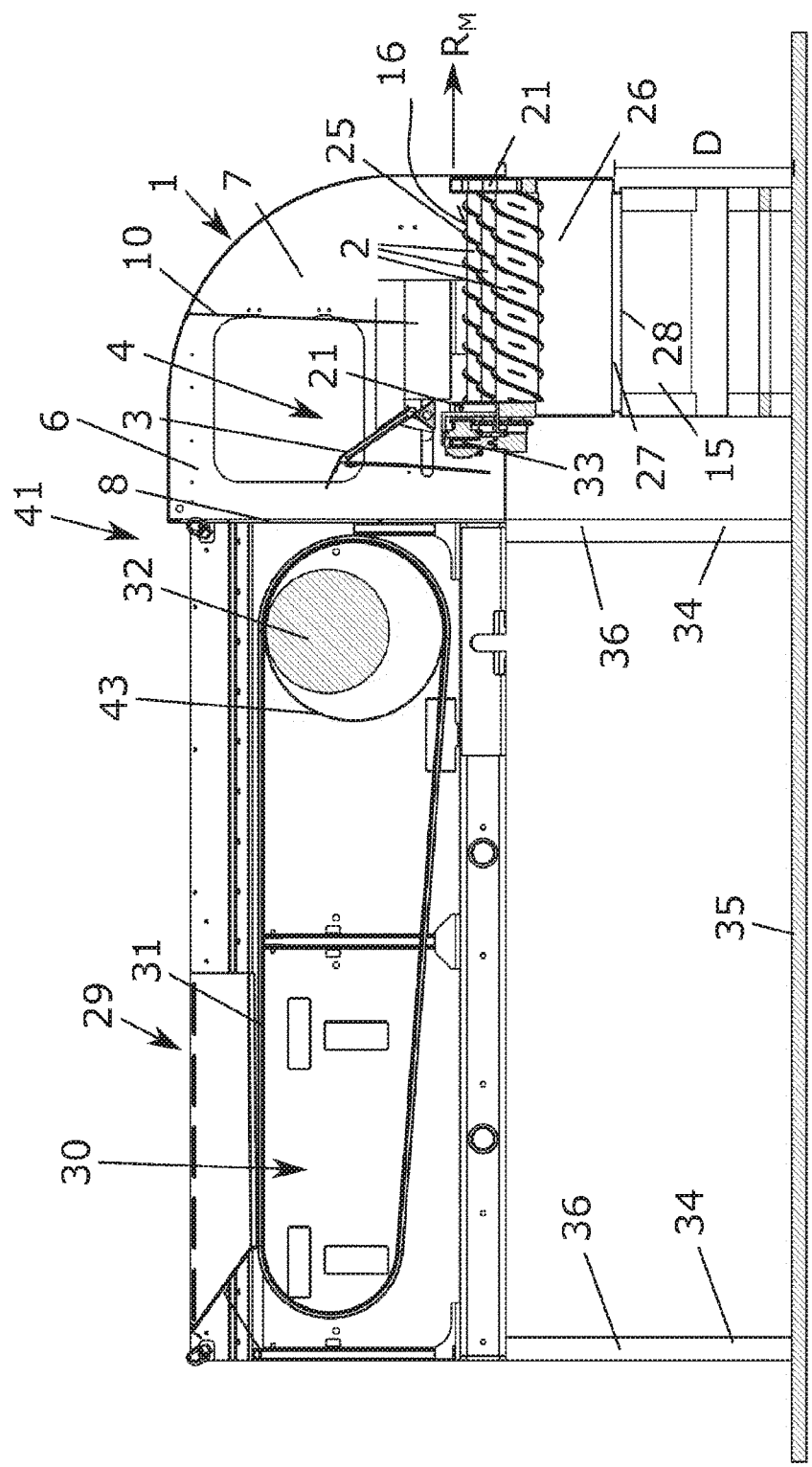
FIG. 4 is a lateral section view of the third embodiment of a sorting device according to the invention and of an eddy current separating device according to the invention.

FIG. 4 shows a side view of sorting device 1 according to the embodiment of FIG. 3 in connection with an eddy current separating device 29. Eddy current separating device 29 comprises a feeder 30 in the form of a conveyor belt 31, which can be used to transport slag from a waste incineration plant or a thermal waste utilization plant. In addition, eddy current separating device 29 comprises an eddy current device 41 which comprises a magnetic drum 32 inside a pole drum 43. By means of eddy current device 41, which is disposed at the end of feeder 30, the trajectory of non-ferrous objects of the slag transported or conveyed on feeder 30 can be selectively influenced after they have left feeder 30. In particular, non-ferrous objects can have more kinetic energy after leaving feeder 30 through eddy current device 41 than slag parts of the slag, for example, and can thus pass through trajectory separator device 4 above baffle plate 3 after entering through entry area 8 of the sorting device, whereas slag has less kinetic energy and passes through trajectory separator device 4 below baffle plate 3 after entering sorting device 1 through entry area 8.

As can be seen in the lateral illustration of FIG. 4, sorting device 1 also comprises multiple rollers 2 having a surface 16 with a profile 25 and a plurality of sorting gaps 5 formed between rollers 2 or by rollers 2. The illustration of FIG. 4 shows narrowing means 26 below rollers 2, which have been described before with reference to FIG. 3 and which lead to ejection gap 27, which is disposed flush with an entry gap 28 of storage container 15. Drive 33 for rotating rollers 2 about axes of rotation A not illustrated in FIG. 4 are disposed on a side or at an end of rollers 2 facing entry area 8. Drive 33 is disposed partially or fully within hood interior 7 of discharge hood 6 and is attached to bearing means 21. Eddy current separating device 29 comprises a frame 34 which spaces eddy current separating device 29 apart from ground 35. Frame 34, in particular supports 36 of frame 34, is/are realized in such a manner that a distance which is high or large enough for storage container 15 to be disposed there is formed between the outlet, in particular ejection gap 27, of at least one sorting gap 5, i.e., between narrowing means 26 disposed below rollers 2 and ground 35. Advantageously, the distance between the outlet or ejection gap 27 of narrowing means 26 and ground 35 is at least 40 cm, preferably at least 60 cm, particularly preferably at least 80 cm.

Figure 5:
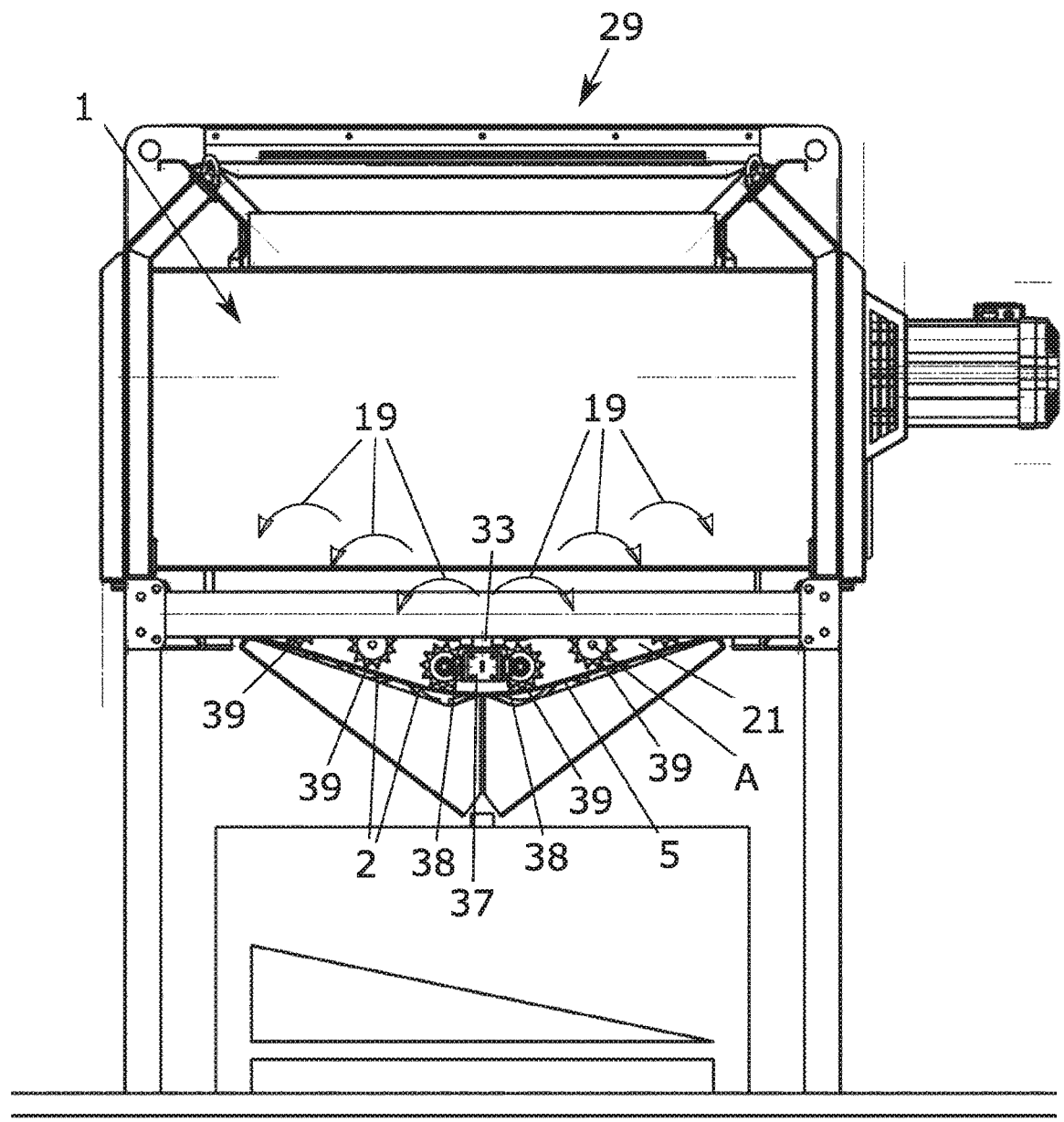
FIG. 5 is a front view of a first embodiment of an eddy current separating device according to the invention.

FIG. 5 shows another view of sorting device 1 and of eddy current separating device 29 according to the embodiment or embodiments illustrated in FIGS. 3 and 4. In addition to mounting means 21 of rollers 2, the illustration of FIG. 5 also shows a drive and gear mechanism unit connected to drive 33 and indirectly acting on axes A of rollers 2. It comprises a gear mechanism 37 having an output 38 on each of two opposite sides. Output 38 can comprise a spur gear which meshes with gear wheels 39 connected to axes of rotation A. Thus, a shared or a single drive 33 can be used to drive or rotate the two middle rollers 2 and, via corresponding coupling of respective gears 39, also the other rollers 2. Particularly preferably, the total of six rollers 2 can be driven via drive 33 in a manner as illustrated by directional arrows 19. This means that middle rollers 2 rotate in opposite directions, surface 16 of rollers 2 accelerating objects, in particular non-ferrous metal objects, coming in contact with the rollers in the area of sorting gap 5 at least also against their weight so as to avoid jamming of objects between rollers 2, in particular in sorting gap 5. In addition to the application of force against the weight vector, an additional force component, namely in the direction out of the drawing plane of FIG. 5, can be generated of course by profile 25 of surface 16 of rollers 2, which add to the discharge of non-ferrous metal objects not passing through the sorting gap or the sorting gaps out of sorting device 1. As indicated by movement arrows 19, rollers 2 can additionally form two groups of rollers rotating in the same direction, namely a left roller group rotating in the counter-clockwise sense and a right roller group rotating in the clockwise sense.

A single shared drive 33 for rollers 2 or the rollers of a roller assembly 44 also has the advantage that all rollers 2 are shut down in the event of a failure and damage to the device, in particular to the rollers, is avoided.

Preferably, drive 33 can be configured to operate with a variable frequency, in particular a steplessly settable frequency. This means that the area covered by surface profiles of rollers 2 can be set and thus sorting gap 5 is varied. Moreover, the feeding speed of the non-ferrous metal objects along axes of rotation A of rollers 2 can be varied by changing the drive frequency or speed, thereby setting the dwelling time of the non-ferrous metal objects in the area of sorting gaps 5. These setting options allow the sorting quality to be changed and set by changing the speed or frequency of drive 33.

Figure 6:
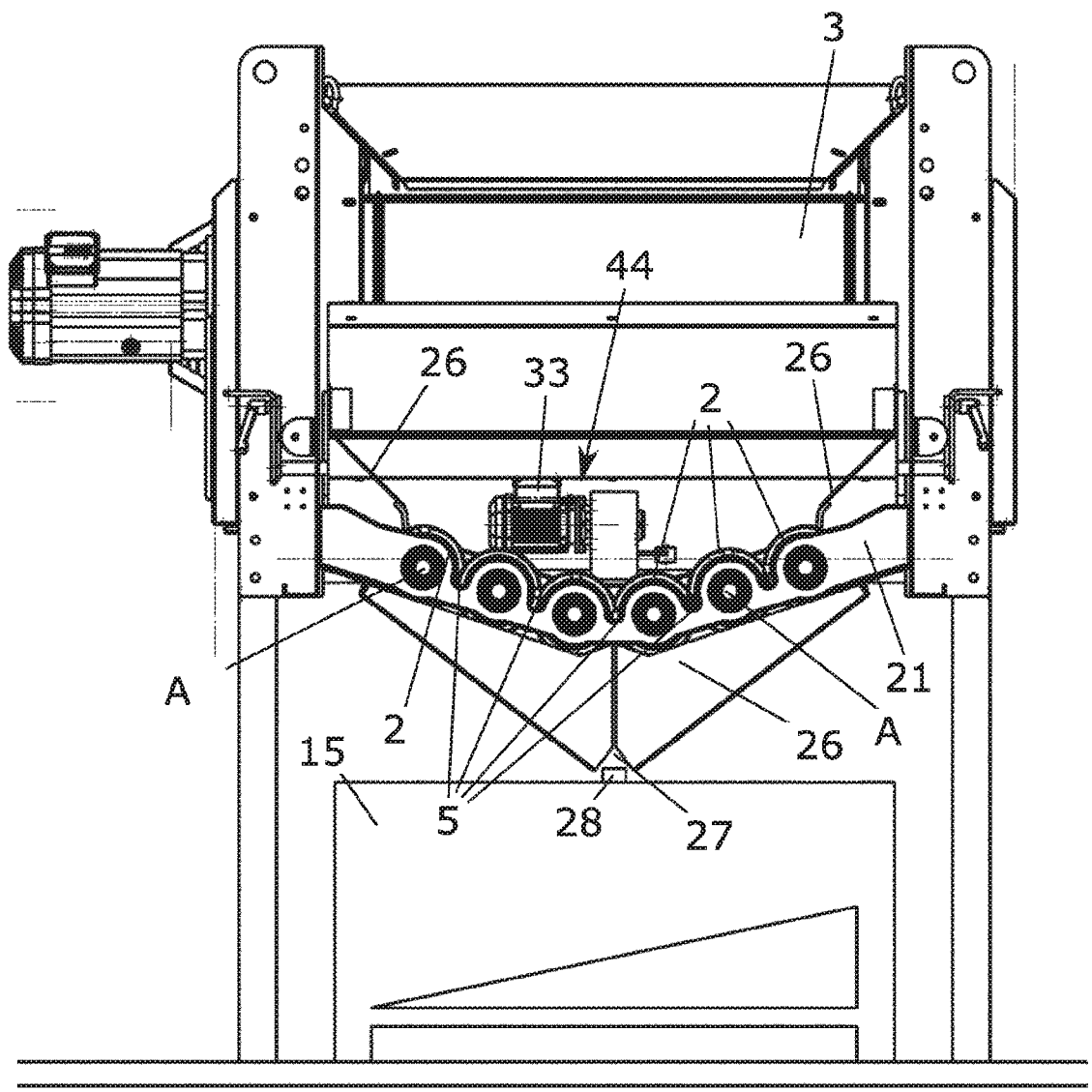
FIG. 6 is a schematic rear view of a first embodiment of an eddy current separating device according to the invention.

In the illustration of FIG. 6, which shows an illustration in the direction opposite to that of the illustration of FIG. 5, drive 33 of the total of six rollers 2 is illustrated again. The six rollers 2 form a total of five sorting gaps 5. In order to prevent unsorted passage of non-ferrous metal objects on the sides of outer rollers 2 and to additionally enable a sorting of coins as effective as possible by the rollers 2 disposed or mounted in a shape, narrowing means 26 are also disposed above rollers 2. Notwithstanding the illustration of FIG. 6, above rollers 2, each narrowing means 26 can end above axis of rotation A of the respective outer roller. This also effectively prevents jamming between outer roller 2 and narrowing means 26.

The narrowing means which are disposed below rollers 2 and which form ejection gap 27, which is disposed flush with entry gap 28 of storage container 15, are again easily visible in FIG. 6.

The illustration of FIG. 6 also shows a roller assembly 44 which comprises at least bearing means 21, a plurality of rollers 2 and a drive 33 assigned to roller assembly 44. Roller assembly 44 can also be configured with more or less rollers 2 for use. Particularly preferably, two middle rollers 2 are driven directly by drive 33 and the other rollers 2 are driven indirectly via driven middle rollers 2.

In the illustrations of FIGS. 3 to 6, feeder 30 of eddy current separating device 29 can have a width of about 1 m. In this case, the embodiment of FIGS. 3 to 6 has proven advantageous, in which a total of six rollers 2 are disposed in a v-shape and, if applicable, narrowing means 26 above rollers 2 concentrate or guide the non-ferrous metal fraction separated off by trajectory separator device 4. When an eddy current separating device 29 has a wider feeder 30, such as a feeder having a width of 1.5 m, it may be advantageous if sorting device 1 also has the embodiment illustrated in FIGS. 3 to 6 with six rollers 2 disposed in a v-shape, the narrowing means disposed above rollers 2 effecting a greater narrowing.

When an eddy current separating device 29 has a feeder that has a width of more than 1.50 m, in particular up to 2 m, a total of twelve rollers 2 can particularly preferably be provided, which then comprise two v-shaped arrangements as those shown in FIGS. 3 to 6. To this end, the sorting device can advantageously comprise two identical roller assemblies 44 disposed side by side, each roller assembly 44 comprising at least two, preferably four, particularly preferably six or eight rollers having corresponding bearing means, and each roller assembly 44 in particular comprising its own independent drive 33, which preferably drives two rollers of respective roller assembly 44 directly. Particularly preferably, identical assemblies can be used in different sorting devices and eddy current separating devices, which reduces constructive complexity and production costs.

This means that the roller assembly can be v-shaped, and narrowing means 26 can again be used on the sides and in the connecting area between the two v-shaped assemblies, if applicable. When there are two v-shaped sets composed of six rollers 2 and five sorting gaps 5 each, narrowing means 26 disposed below rollers 2 can narrow or direct non-ferrous metal objects, in particular coins, passing through sorting gaps 5 to two separate ejection gaps 27. Accordingly, two storage containers 15 can be used. Alternatively, one shared storage container 15 having two entry gaps 28 assigned to the two ejection gaps 27 can of course be used, as well.

REFERENCE SIGNS 1 sorting device
2 roll
3 baffle plate
4 trajectory separator device
5 sorting gap
6 discharge hood
7 hood interior
8 entry area
9 separator area
10 baffle curtain
11 trajectory of passing object
12 non-ferrous metal object
13 trajectory of non-passing object
14 slag object
15 storage container
16 surface
17 rubber curtain
18 displacement means
19 directional arrow
20 pair of rollers
21 bearing means
22 side wall
23 oblong hole
24 bearing support
25 profile
26 narrowing means
27 ejection gap
28 entry gap
29 eddy current separating device
30 feeder
31 conveyor belt
32 magnetic drum
33 drive
34 frame
35 ground
36 support
37 gear mechanism
38 output
39 gear wheel
40 coin discharge device
41 eddy current device
42 lower edge
43 pole drum
44 roller assembly
D distance
A axis of rotation
$R_M$ discharge direction of the non-ferrous metal objects
$R_C$ coin discharge direction
M central longitudinal axis
P passage plane

The invention claimed is:

1. A sorting device for sorting out coins from bulk material, the sorting device comprising
at least one sorting gap (5) for coins, each sorting gap of the at least one sorting gap (5) being limited by at least one roller (2) which can be rotated about an axis of rotation (A) by means of a drive (33) in such a manner that objects that cannot be transported through the sorting gap (5) are subjected to a force in a direction away from the sorting gap (5), along the axis of rotation (A) of the at least one roller, by the at least one roller (2), further comprising
a discharge hood (6) which has an opening (8) for receiving an array of bulk material, and a trajectory separator device (4) in a hood interior (7) for separating a non-ferrous metal fraction from the array of bulk material, the at least one roller (2) being disposed in or on the discharge hood (6) relative to the trajectory separator device (4) in such a manner that the non-ferrous metal fraction separated out from the bulk material by the trajectory separator device (4) is transported in the direction of the sorting gap (5) by the weight of the non-ferrous metal objects (12).

2. The sorting device according to claim 1, wherein the axis of rotation (A) of the at least one roller (2) extends horizontally parallel to an entry area (8) of the discharge hood (6) or forms an angle of 3° to 5° relative to the horizontal.

3. The sorting device according to claim 1, wherein the sorting gap (5) is limited by the at least one roller (2) and by a baffle plate (3) of the trajectory separator device (4).

4. The sorting device according to claim 3, wherein the discharge hood (6) has displacement means (18) for changing the position of at least the baffle plate (3) of the trajectory separator device (4).

5. The sorting device according to claim 1, wherein the at least one roller (2) is bilaterally mounted by bearing means disposed on both sides, the bearing means (21) being disposed in such a manner that the axis of rotation (A) of the at least one roller (2) extends above a lower edge (42) of the discharge hood (6).

6. The sorting device according to claim 5, wherein the bearing means (21) of the at least one roller (2) are connected to at least one baffle plate (3) of the trajectory separator device (4) in a separable manner, the discharge hood (6) having displacement means (18) for changing the position of the bearing means (21), and the bearing means (21) being movable within the hood interior (7) of the discharge hood (6) together with the at least one baffle plate (3) when they are connected.

7. The sorting device according to claim 1, further comprising a coin discharge device (40) disposed below the at least one sorting gap (5), the coin discharge device (40) being designed in such a manner that the non-ferrous metal objects passing through the at least one sorting gap (5) are discharged in a coin discharge direction ($R_C$) toward a side of the sorting device in a direction opposite to a non-ferrous metal discharge direction ($R_M$), in which the non-ferrous metal objects not passing through the at least one sorting gap are discharged from the sorting device.

8. The sorting device according to claim 1, wherein the axis of rotation (A) of the at least one roller (2) extends horizontally perpendicular to an entry area (8) of the discharge hood (6) or forms an angle of 3° to 5° relative to the horizontal.

9. The sorting device according to claim 1, wherein the at least one roller (2) comprises at least two rollers (2), and wherein the at least one sorting gap (5) is limited or formed by the at least two rollers (2), a drive (33) of the at least two rollers (2) being designed in such a manner that at least two of the at least two rollers (2) rotate in opposite directions.

10. The sorting device according to claim 9, wherein the at least two rollers (2) comprises four rollers (2) and further comprising bearing means (21) being designed in such a manner that a parallel, v-shaped or u-shaped arrangement of the four rollers (2) is achieved.

11. The sorting device according to claim 9, wherein a shared drive (33) for the at least two rollers (2) is provided, opposite rotation of the at least two of the at least two rollers (2) being achieved by means of a gear mechanism (37) connected to the drive (33).

12. The sorting device according to claim 9, wherein the drive (33) is disposed on a side of the at least two rollers (2) facing the entry area (8) of the discharge hood (6), within the hood interior (7).

13. The sorting device according to claim 1, wherein narrowing means (26) are disposed above the at least one roller (2) perpendicular to the entry area (8) of the discharge hood (6), non-ferrous objects (12) coming from the trajectory separator device (4) being directed in the direction of a central longitudinal axis of the discharge hood (6).

14. The sorting device according to claim 13, wherein on the side facing the at least one roller (2), the narrowing means (26), at least at each end of the narrowing means (26), is above an axis of rotation (A) of an outer roller (2) of the at least one roller (2).

15. The sorting device according to claim 1, wherein narrowing means (26) by means of which the non-ferrous objects (12) passing through the at least one sorting gap (5) are directed to a shared ejection gap (27) are disposed below the at least one roller (2).

16. The sorting device according to claim 15, wherein the narrowing means (26) disposed below the at least one roller (2) are designed in such a manner that the weight of the non-ferrous objects (12) passing through the at least one sorting gap (5) enables the non-ferrous objects (12) to exit the ejection gap (27).

17. The sorting device according to claim 1, wherein the at least one roller (2) comprises two identical roller assemblies (44) disposed side by side, each roller assembly (44) comprising at least two rollers (2) having corresponding bearing means (21), and each roller assembly (44) comprising its own independent drive (33), which drives two rollers (2) of the respective roller assembly (44) directly.

18. An eddy current separating device comprising a feeder (30) configured to convey bulk material, the eddy current separating device comprising at least one eddy current device (41) which is disposed at an end of the feeder (30) and which selectively changes the trajectory (11) of non-ferrous objects (12) of the bulk material after they have left the feeder (30), the eddy current separating device (29) having attachment means for attaching a discharge hood (6) disposed downstream of the feeder (30), further comprising a sorting device according to claim 1.

19. The eddy current separating device according to claim 18, further comprising a frame (34) for spacing the eddy current separating device (29) from a ground (35), the frame (34) being designed in such a manner that there is a distance (D) of at least 40 cm between an outlet of the at least one sorting gap (5) and the ground (35).

20. The eddy current separating device according to claim 18, wherein
the at least one sorting gap (5) has a passage plane in which non-ferrous objects (12) can pass through the at least one sorting gap (5), the passage plane having at least a vertical component which is perpendicular to a feeding plane of the feeder (30).

21. The eddy current separating device according to claim 18, wherein the at least one sorting gap (5) has a passage plane in which coins can pass through the at least one sorting gap (5), the passage plane being perpendicular to a feeding plane of the feeder (30).

22. The eddy current separating device according to claim 18, wherein the feeder (30) has a width of more than 1.50 m and wherein the at least one roller (2) of the sorting device comprises two identical roller assemblies (44) disposed side by side.

23. A sorting device for sorting out coins from bulk material, the sorting device comprising at least one sorting gap (5) for coins, each sorting gap of the at least one sorting gap (5) being limited by at least one roller (2) having surface structure (16), wherein the at least one roller (2) can be rotated about an axis of rotation (A) by means of a drive (33) in such a manner that the surface structure (16) of the at least one roller (2) applies a force to objects that cannot be transported through the at least one sorting gap (5), the force being applied in a direction away from the at least one sorting gap (5), along the axis of rotation (A) of the roller,
further comprising
a discharge hood (6) which has a trajectory separator device (4) in a hood interior (7), the at least one roller (2) being disposed in or on the discharge hood (6) relative to the trajectory separator device (4) in such a manner that a non-ferrous metal fraction separated out from the bulk material by the trajectory separator device (4) is transported in the direction of the at least one sorting gap (5) by the weight of the non-ferrous metal objects (12).

* * * * *